(12) United States Patent
Müller

(10) Patent No.: US 10,041,598 B2
(45) Date of Patent: Aug. 7, 2018

(54) COAXIALLY DESIGNED, PRESSURE-COMPENSATED, DIRECTLY CONTROLLED VALVE WITH LOW PRESSURE LOSSES

(71) Applicant: Friedrich Müller, Neuenstadt (DE)

(72) Inventor: Friedrich Müller, Neuenstadt (DE)

( * ) Notice: Subject to any disclaimer, the term of this patent is extended or adjusted under 35 U.S.C. 154(b) by 0 days.

(21) Appl. No.: 15/276,944

(22) Filed: Sep. 27, 2016

(65) Prior Publication Data

US 2017/0089484 A1  Mar. 30, 2017

(30) Foreign Application Priority Data

Sep. 28, 2015  (DE) .................. 10 2015 012 444

(51) Int. Cl.
*F16K 1/12* (2006.01)
(52) U.S. Cl.
CPC .................... *F16K 1/123* (2013.01)
(58) Field of Classification Search
CPC ....................................................... F16K 1/123
USPC ................................................ 251/343, 344
See application file for complete search history.

(56) References Cited

U.S. PATENT DOCUMENTS

| 2,996,074 A | 8/1961 | Page et al. | |
| 3,633,608 A * | 1/1972 | Minkner | F16K 31/1226 137/220 |
| 4,589,439 A * | 5/1986 | Steingass | F16K 1/123 137/219 |
| 5,351,934 A * | 10/1994 | Jensen | F16K 1/123 251/129.1 |
| 5,529,281 A * | 6/1996 | Brudnicki | F16K 1/123 251/129.03 |
| 6,412,750 B1 * | 7/2002 | Jun | F16K 1/123 251/129.11 |
| 7,066,447 B2 * | 6/2006 | McCarty | F16K 1/123 251/344 |

FOREIGN PATENT DOCUMENTS

| DE | 3738494 A1 | 5/1988 |
| DE | 19837694 A1 | 2/2000 |
| DE | 102010048901 A1 | 4/2012 |
| FR | 850567 A | 12/1939 |
| FR | 969077 A | 12/1950 |
| FR | 1568846 A | 5/1969 |
| WO | 2016064537 A1 | 4/2016 |

OTHER PUBLICATIONS

Search Report dated Oct. 6, 2016 in DE Application No. 102015012444.7.

* cited by examiner

*Primary Examiner* — Eric Keasel
(74) *Attorney, Agent, or Firm* — Panitch Schwarze Belisario & Nadel LLP

(57) ABSTRACT

A shut-off valve for controllable fluid flow may include a closing member that substantially has the structure of a hollow, round pipe, and which closing member may be pushed axially along the axis of the closing member within the valve body in order to shut off the flow of medium. The closing member may be pressed on an end face against a seat in order to shut off the flow of medium. The closing member may be directly operated with an electromagnetic lift drive.

10 Claims, 5 Drawing Sheets

COAXIALLY DESIGNED, PRESSURE-COMPENSATED, DIRECTLY CONTROLLED VALVE WITH LOW PRESSURE LOSSES

CROSS REFERENCE TO RELATED APPLICATION

This application claims priority to German Application No. 10 2015 012 444.7, filed Sep. 28, 2015, the contents of which are incorporated by reference herein.

BACKGROUND

Valves are used in order to control the flow of medium in a pipeline. Virtually all designs of valves (ball valve, poppet valve, slide valve, diaphragm valve, butterfly valve) have the property of the actuating forces of the closing member becoming larger with increasing pressure within the pipeline. At the latest in the shut-off state of the valves, the higher pressure differential often provides, at least proportionally, for increasing actuating forces or actuating moments. Explained by way of example of a poppet valve, this means that in the case of a closed valve the forces, which are required to raise the ball from the seat, increase approximately linearly with the increasing pressure differential. These forces can be very easily determined by taking the area of the seated cone times the pressure differential. Very similar conditions also prevail in the different known fitting designs such as ball valves, slide valves etc. This dependency of the closing forces is, in particular significant when such a valve is to be operated in a directly-controlled magnetic manner. At the latest in the case of seat diameters or cone diameters of 20 mm and greater and differential pressures of 40 bar and greater, the forces become so great that actuation of the poppet valve is possible by means of an electromagnet only with extremely high output. This is generally not acceptable and thus only few directly-controlled globe valves are found above DN25 and above PN25.

Nonetheless, in many cases electro-magnetically directly-controlled valves are required, for example in cases of use where no pressurised air or no hydraulics are available. An electrical power supply is nowadays available on virtually every machine or installation and thus electrically actuated solenoid valves always have their advantages.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF ASPECTS OF THE DISCLOSURE

Figure 1:
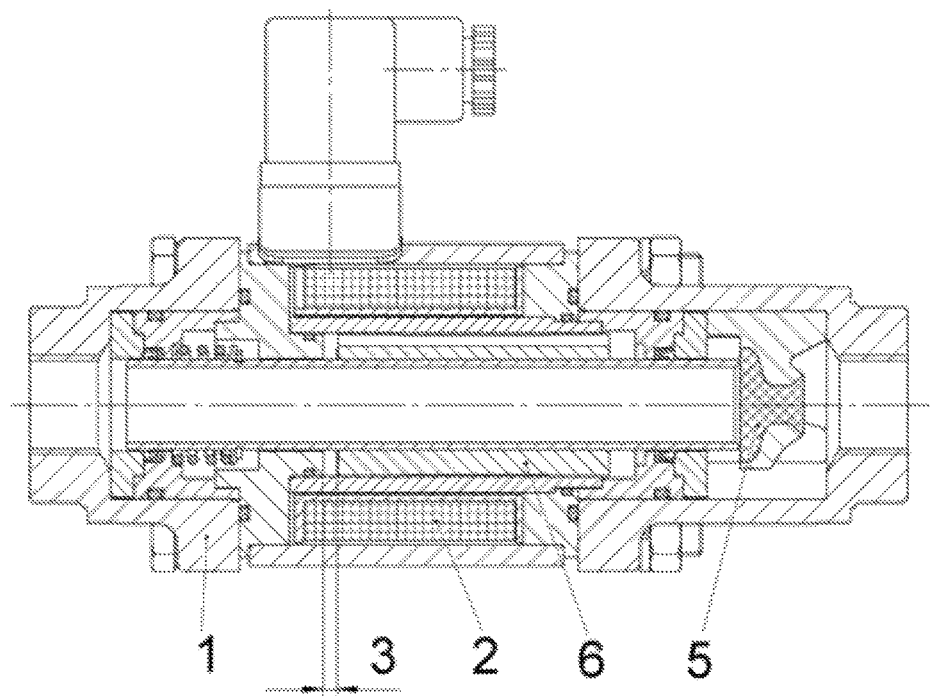
FIGS. 1 to 4 show various cross-sectional views of valves according to the prior art.

The so-called coaxial, pressure-compensated design of valves has been available on the market for approximately 50 years, as illustrated in FIG. 1. The company, müller co-ax ag from Forchtenberg is, for example a manufacturer who manufactures valves, the actuating forces of which only rudimentarily depend on the pressures prevailing in the valve. A pipe that is axially movable within the valve body 1 serves as the closing member 6 and is usually designated as the control pipe which is moved back and forth along the control pipe axis by means of the pole core of the corresponding magnetic coil 2 fixedly connected to the pipe-shaped closing member in order to be able to regulate or shut off the flow of medium through the valve. The end face of the control pipe is pressed against the seat 5 here for tight closure of the valve, i.e. the shutting off of the flow of medium. See e.g. patent: DE19837694 B4. Since such a design is virtually perfectly pressure-compensated, the actuating forces of the control pipe depend only very slightly on the pressures prevailing within the valve.

Figure 2:
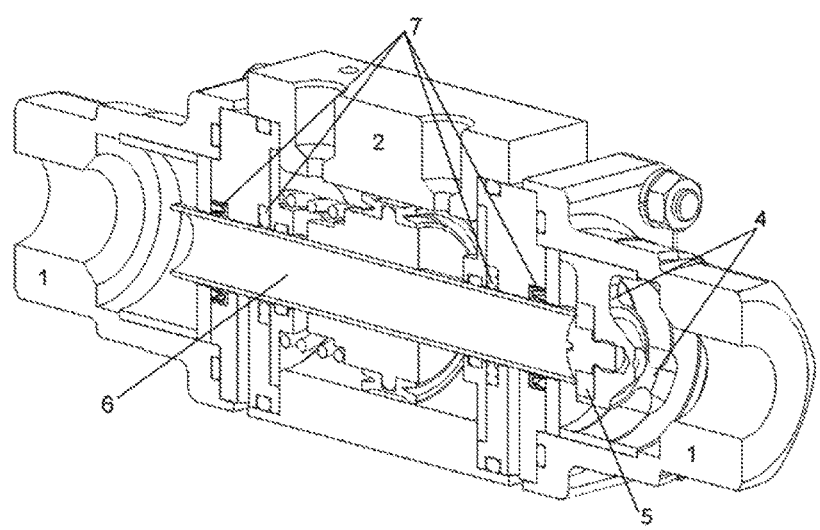

Unlike a conventional poppet valve, in the case of which the pressure prevailing in the valve always exerts a force on the closing member along the closing direction such that the actuating forces are always influenced virtually linearly directly by the pressure prevailing in the valve, it is different in the case of the coaxially designed valve according to FIG. 1. In the valve according to FIG. 1, the pressure always acts radially on the walls of the control pipe irrespective of the installation direction and thus perpendicular to the actuating direction of the closing member 6. The pressure conditions prevailing within the valve designed in this manner have virtually no influence on the actuating forces of the closing member 6. In order to actuate such a valve, only the frictional forces resulting in the dynamic seals 7, which serve to seal off the control pipe externally, have to essentially be overcome. This design allows valves with small actuating forces to be designed for high pressures even in large nominal sizes. Such coaxially designed, pressure-compensated, directly-controlled, electromagnetically-operated or piston-driven valves have hitherto been manufactured in the design shown, wherein the drive, which is required for actuating the control pipe, is designed coaxially around the control pipe. The entire valve is substantially coaxially designed. Hydraulically controlled valves are also designed in an analogous manner FIG. 2.

Figure 3:
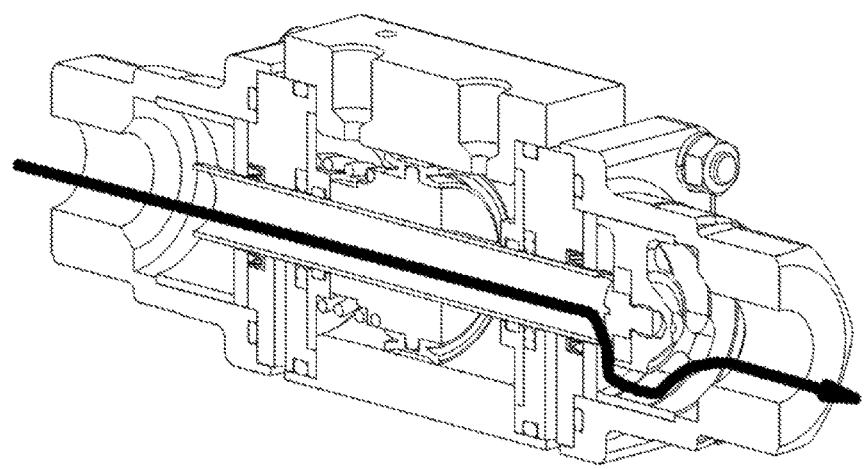
Figure 4:
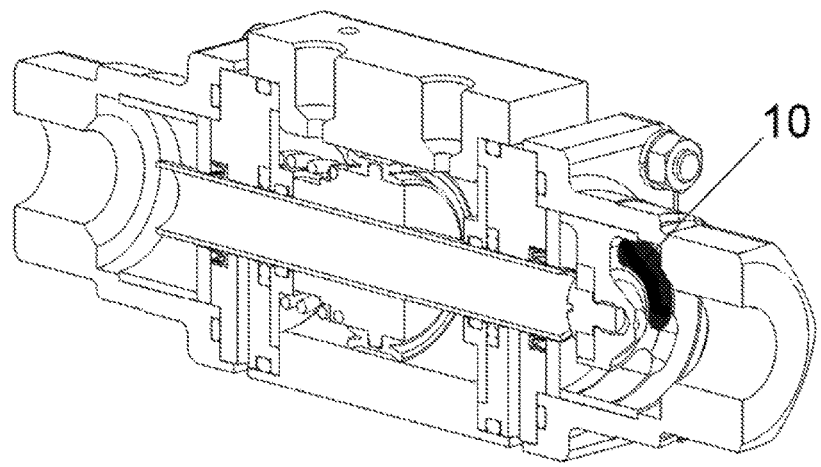

Unfortunately, pressure losses are very high in the case of the flow through the currently known constructions of coaxially designed valves. This is particularly caused by the multiple deflection (in the example shown, deflected by 90° fourfold in total) of the flow in the region of the seat 5 and by the constriction through the support ribs 4 arranged precisely in this region. In FIG. 3, the flow is illustrated in the manner of a sketch.

The currently conventional design of the valves leads to high pressure losses in the valve and the low Kv values associated therewith.

There is thus a need for a coaxially designed valve, which can be used for high pressures in the case of low actuating forces, in the case of which, however, pressure losses should be obtained that are smaller than those obtained using today's conventional constructions.

This requirement should be covered in accordance with the invention in the manner described below.

The solution according to the invention is the construction of a coaxially designed valve, which is pressure-compensated, the structure of which substantially corresponds to that of the conventional valve currently on the market, in the case of which, however, the mounting of the seat 5 and the arrangement of the support ribs 4 as well as the flow direction is in particular altered.

In a commercially available valve, the seat 5 would be connected by support ribs 4 to the housing 1 in direct proximity to the seat 5. In this manner, the clear opening 10 is divided into a plurality of respectively small partial regions and is represented only by a plurality of smaller oval or round openings. The result is large deflections and flow losses at the generally only very small openings. It should also be mentioned that the current can flow in a notably more unobstructed manner through a large opening than through a plurality of small openings even if the cross-sectional area of the plurality of small openings is equal to the cross-sectional area of a large opening.

Figure 5:
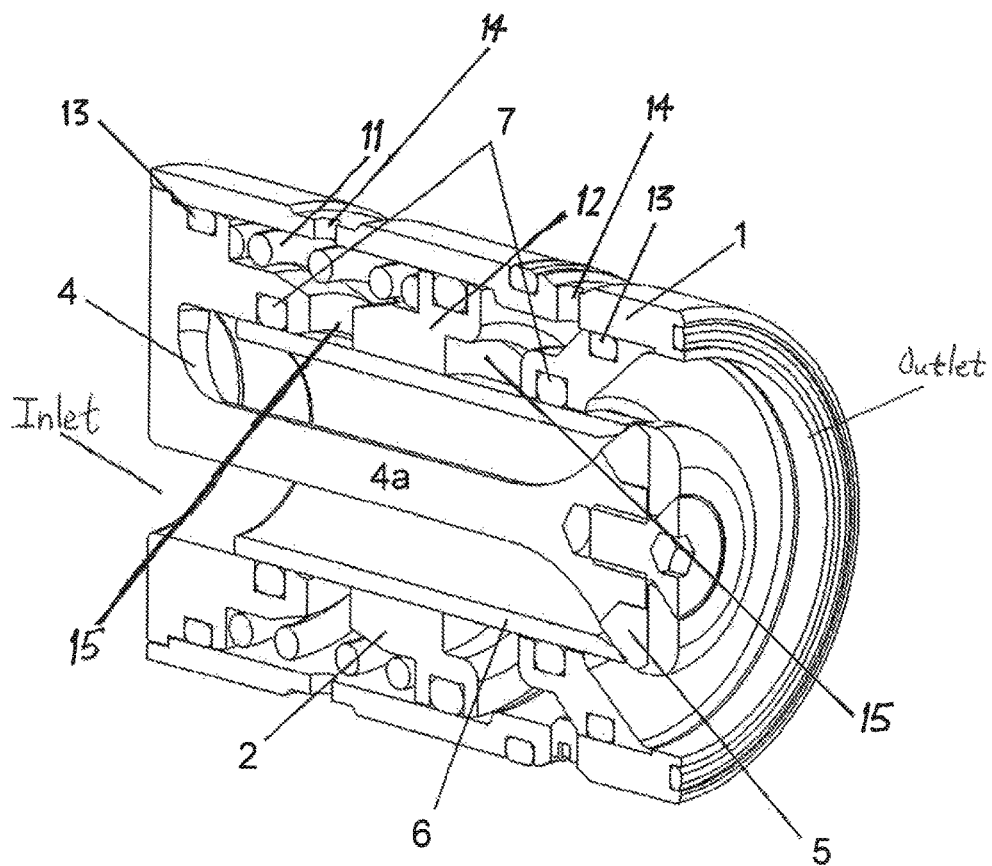
FIG. 5 shows a cross-sectional view of a valve according to an aspect of this disclosure.

FIG. 5 schematically shows the design of the valve according to the invention. Unlike a commercially available valve according to the prior art, the mounting of the seat 5 is loosened in a different manner. The support ribs 4 are no longer arranged in the direct region of the seat 5, but rather as far away as possible from the same. This can be both on the side of the seat 5 and also on the other end of the closing member 6, as depicted in FIG. 5 and below.

FIG. 5 schematically shows an embodiment, which may be used for hydraulic or pneumatic control of the valve. Fluid inlet/output ports 14 are shown, through which a fluid (liquid, in the case of hydraulic control, or air or other gas, in the case of pneumatic control) may be furnished to and released from volumes 15. In this case, element 11 may represent a spring that may be used to bias the armature 12. Further dynamic seals 13 may also be provided. In this embodiment, fluid (again, liquid or gas) may be furnished through one of the fluid inlet/outlet ports 14, into a respective volume 15, which may push armature 12 in one direction and, at the same time, force fluid out of the other volume 15, through its respective inlet/outlet port 14 (which fluid may also, or alternatively, be pumped out of this other volume 15).

As discussed above, designs of electronically-controlled and pneumatically/hydraulically-controlled valves of the present type are analogous, and therefore, the embodiment shown in FIG. 5 may be altered to incorporate the electronic control components, as shown in FIG. 1.

There are many possibilities here of which only a few examples are explained. Ideally the support ribs 4 required for mounting the seat 5 within the housing 1 are as far away as possible from the seat 5 and are in a region of the housing 1 which has a clear opening that is as large as possible such that the constriction by one or a plurality of the support rib 4 causes the obstruction of the flow to be as small as possible. Ideally only one support rib 4 is required for mounting the seat FIG. 5 and FIG. 6 and FIG. 7. The support rib 4 preferably has a preferably cylindrical region 4a which is guided through the closing member 6 and is used for mounting the seat 5.

Figure 6:
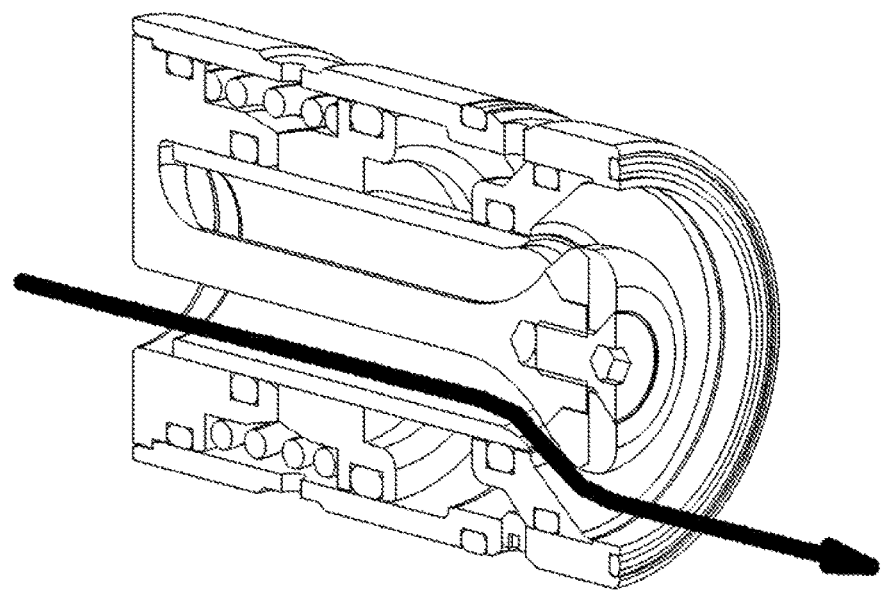
FIG. 6 shows another cross-sectional view of a valve according to an aspect of this disclosure.
Figure 7:
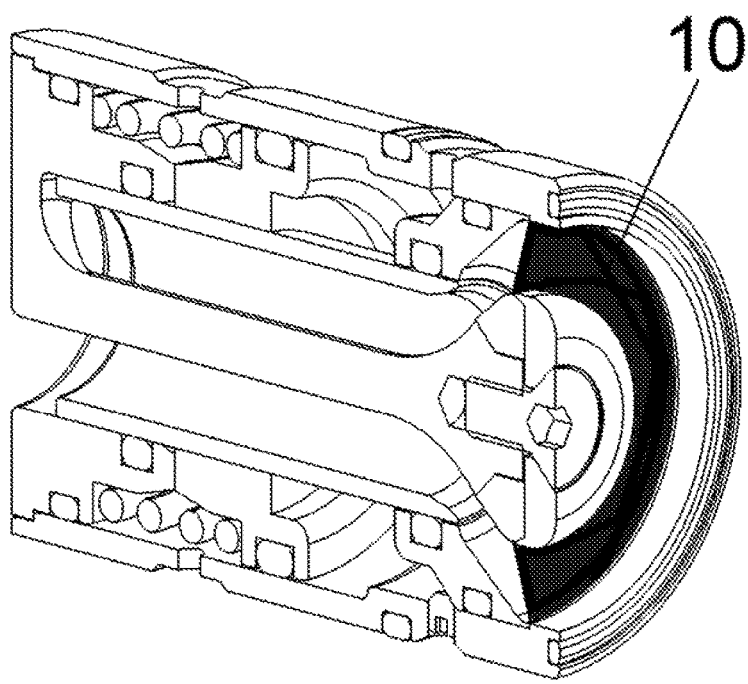
FIG. 7 shows a further cross-sectional view of a valve according to an aspect of this disclosure.

FIG. 5 schematically shows the design of the valve according to the invention in a closed position. FIG. 6 schematically shows the design of the valve according to the invention in an open position with sketched flow course. It can be clearly observed that the flow is guided notably more smoothly around the seat 5. In the illustrated example only a twofold deflection by approx. 45° respectively. FIG. 7 schematically shows the design of the valve according to the invention in an open position with sketched circular clear opening 10 in the region of the seat 5. It can be clearly observed that the narrowest region for the flow is no longer in the region of the seat 5, as would be the case in a valve according to the current prior art.

Figure 8:
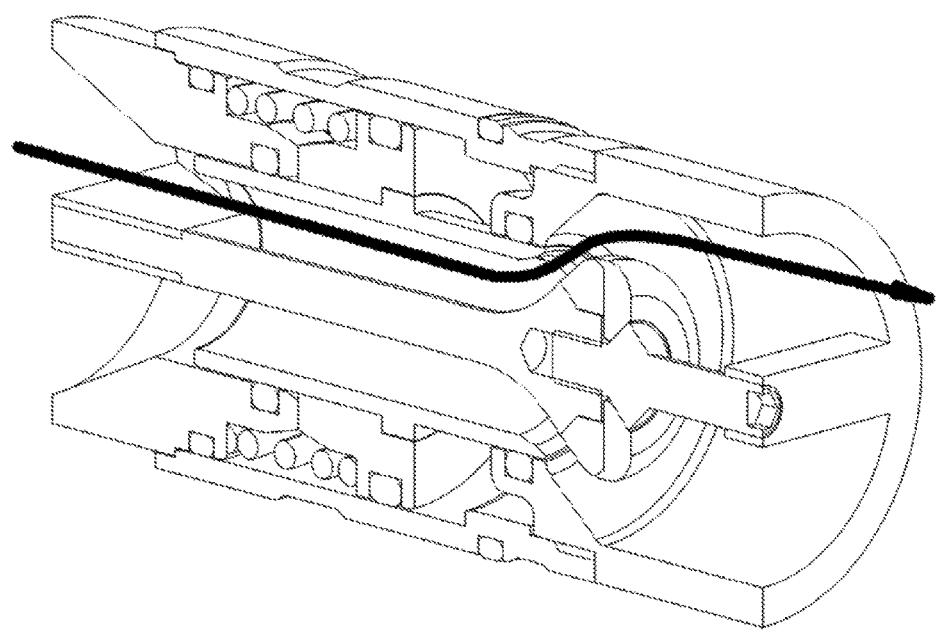
FIG. 8 shows yet a further cross-sectional view of a valve according to an aspect of this disclosure.
Figure 9:
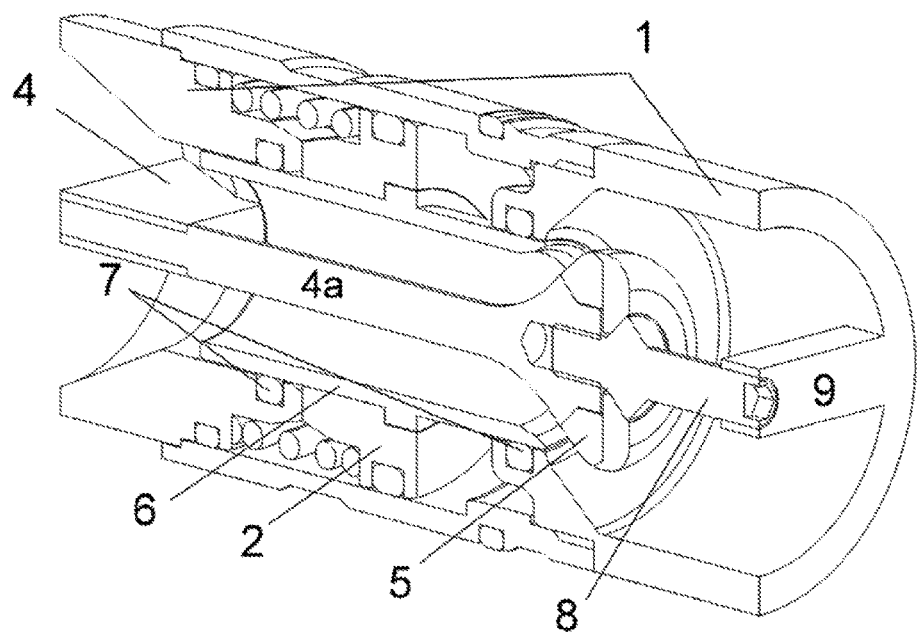
FIG. 9 shows still a further cross-sectional view of a valve according to an aspect of this disclosure.

In the case of valves with a long closing member 6, it may be necessary for the seat 5 to be centred at the opposing end of the valve via one or a plurality of further support rib(s) 9, corresponding to FIG. 8 and FIG. 9, in addition to the already described mounting via the support rib(s) 4. To this end, a centering element 8 would also be arranged on the seat 5; said centering element 8 is guided into one or a plurality of further support rib(s) 9. These support rib(s) 9 are also preferably as far away as possible from the region of the seat 5 in order to obstruct the flow as little as possible and are in a region of the housing 1 which has a clear opening that is as large as possible such that the constriction by one or a plurality of the support ribs 9 causes an obstruction of the flow that is as small as possible.

LIST OF REFERENCE NUMBERS

1 Valve housing
2 Drive: Magnetic or piston drive (pneumatic or hydraulic)
3 Valve stroke
4 One or a plurality of support ribs (of the seat 5)
5 Seat
6 Closing member
7 Dynamic seal
8 Centering element
9 Support rib (of the centering element 8)
10 Clear opening in the seat region
11 Solenoid or Spring
12 Armature
13 Dynamic seal
14 Fluid inlet/outlet
15 Fluid volume

The invention claimed is:

1. A shut-off valve for controllable fluid flow, including:
a valve body;
a valve inlet and a valve outlet;
a closing member, which substantially has the structure of a hollow, round pipe, wherein the closing member is configured to be pushed axially along an axis of the closing member within the valve body in order to shut off a flow of medium and is further arranged to be pressed on an end face against a seat in order to shut off the flow of medium, such that in a shut-off state of the valve, a pressure differential acts substantially radially on a wall of the closing member, and wherein the medium is guided substantially through the closing member in an open state of the valve, and wherein the closing member is configured to be directly operated with a linear actuator, which is arranged substantially coaxially around the closing member, and wherein the seat is disposed at an end of the valve body at which the valve outlet is located; and
one or a plurality of support ribs configured to fix the seat in the valve body, wherein the one or plurality of support ribs are not arranged in the direct vicinity of the seat, but rather is or are formed at an end of the valve body at which the valve inlet is located, wherein the one or a plurality of support ribs has or have a part designed as an elongate rod that is guided, in a direction of an axis of the closing member defined along a direction leading between the valve inlet and the valve outlet, through the closing member and is configured to support the seat, wherein a flow of medium in a region between the seat and the valve outlet is deflected at most twice and at most by a total of 90°, from an initial medium flow direction along the axis of the closing member and back to the initial medium flow direction.

2. The shut-off valve according to claim 1, wherein a clear opening around the seat has a shape of a continuous ring.

3. The shut-off valve according to claim 1, wherein the one or plurality of support ribs are arranged at one of a valve inlet end or a valve outlet end, of the valve body.

4. The shut-off valve according to claim 1, wherein only one support rib provides the fixing of the seat to the valve body.

5. The shut-off valve according to claim 1, wherein the seat includes a centering device, which is guided in one or a plurality of the support ribs, and which is configured to provide centering of the seat in a center of the valve body.

6. The shut-off valve according to claim 1, wherein the one or plurality of support ribs are distanced from the seat axially along the closing member around at least one clear opening of the closing member.

7. The shut-off valve according to claim 5, wherein the support rib or ribs and the part designed as an elongated rod are formed from a plurality of parts.

8. The shut-off valve according to claim 1, further including an electro-magnetically controlled drive configured to actuate the closing member, wherein the electromagnetically controlled drive is arranged substantially coaxially around the control member.

9. The shut-off valve according to claim 1, further including a pneumatically-controlled drive configured to actuate the closing member, wherein the pneumatically-controlled drive is arranged substantially coaxially around the closing member.

10. The shut-off valve according to claim 1, further including a hydraulically-controlled drive configured to actuate the closing member, wherein the pneumatically-controlled drive is arranged substantially coaxially around the control member.

* * * * *